United States Patent [19]

Knapp

[11] Patent Number: 4,957,135
[45] Date of Patent: * Sep. 18, 1990

[54] MIXING VALVE WITH VALVE PLATES PROVIDED WITH AN ATTACHMENT MECHANISM FOR THE FIXED PLATE TO PROVIDE A COMPRESSIVE FORCE

[75] Inventor: Alfons Knapp, Biberach/Riss, Fed. Rep. of Germany

[73] Assignee: Masco Corporation, Taylor, Mich.

[ * ] Notice: The portion of the term of this patent subsequent to Sep. 9, 2003 has been disclaimed.

[21] Appl. No.: 378,528

[22] PCT Filed: Mar. 16, 1987

[86] PCT No.: PCT/US87/00542

§ 371 Date: Dec. 22, 1988

§ 102(e) Date: Dec. 22, 1988

[87] PCT Pub. No.: WO88/07151

PCT Pub. Date: Sep. 22, 1988

[51] Int. Cl.$^5$ .................... F16K 11/078; F16K 25/00
[52] U.S. Cl. .................... 137/454.6; 137/625.17; 137/625.4; 251/172; 251/174; 251/363
[58] Field of Search .............. 137/454.6, 625.17, 625.4, 137/625.41; 251/172, 174, 360, 363

[56] References Cited

U.S. PATENT DOCUMENTS

| | | | |
|---|---|---|---|
| 3,590,837 | 7/1971 | Jeanise | 251/363 X |
| 3,807,455 | 4/1974 | Farrell | 137/454.6 X |
| 4,250,912 | 2/1981 | Knapp | 137/454.6 X |
| 4,325,403 | 4/1982 | Uhlmann | 137/454.6 X |
| 4,610,268 | 9/1986 | Knapp | 137/454.6 |

Primary Examiner—John Rivell
Attorney, Agent, or Firm—Malcolm L. Sutherland

[57] ABSTRACT

A mixing valve includes a faucet body (1), a control mechanism, a support surface (9a) for a fixed valve plate (18) mounted on this support surface, a seal (16, 17) placed between the fixed plate and the support surface and a movable valve plate (19) connected to the control mechanism and appointed to shift in sliding contact with the fixed plate so as to regulate the flow rate and the mixing proportions. An attachment mechanism (31) connects the fixed plate to the support surface, the seal being compressed between them, by these parts exerting a compressive force. The compression of the seal is therefore made independent of the pressure between the fixed and the movable plates which can then be reduced to render better sliding and working of the valve plates. The attachment mechanism can be fixed or removable, and can work near the center of the fixed plate or along its border or in both positions.

8 Claims, 1 Drawing Sheet

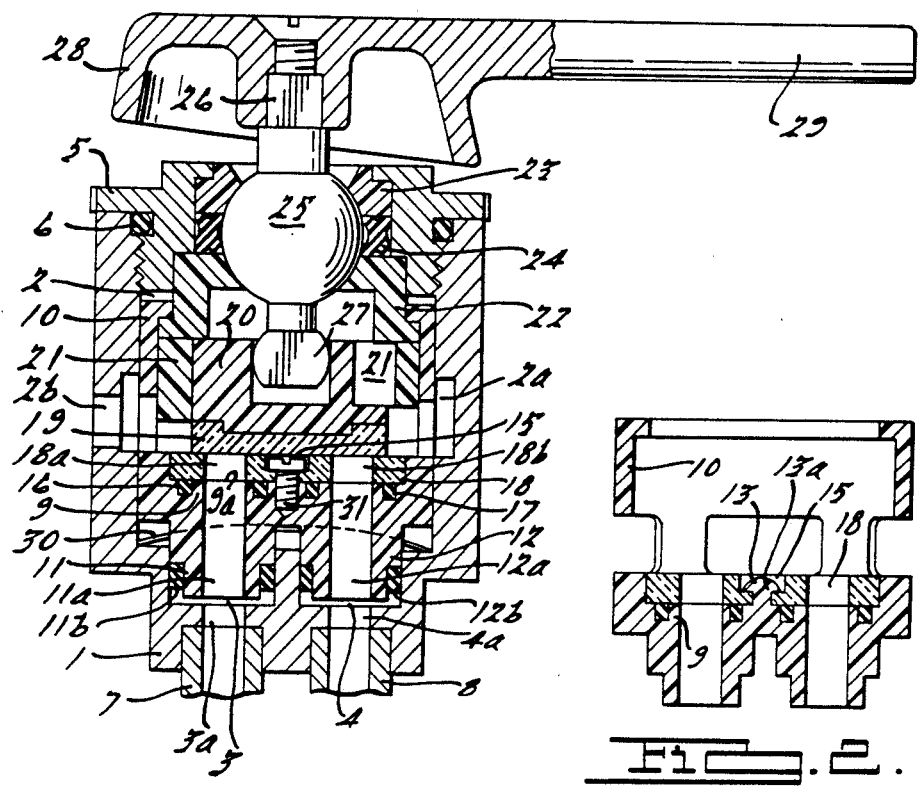
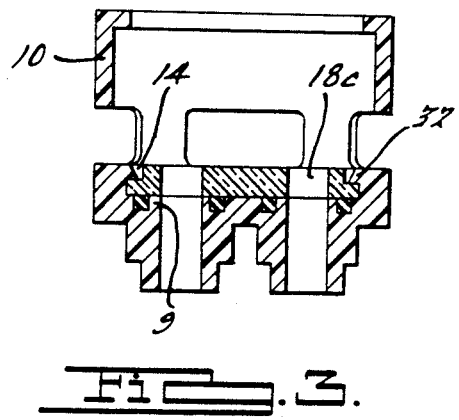

MIXING VALVE WITH VALVE PLATES PROVIDED WITH AN ATTACHMENT MECHANISM FOR THE FIXED PLATE TO PROVIDE A COMPRESSIVE FORCE

TECHNICAL FIELD

The present invention deals with a mixing valve consisting of a faucet body, a cartridge assembly inserted within the faucet body, a control mechanism, a support seat for fixing a valve plate of hard material thereto, a seal placed between the fixed valve plate and the support seat, and a movable valve plate connected to the control mechanism for relative sliding movement with the fixed valve plate so as to regulate the flow rate and the mixing proportions.

BACKGROUND OF THE INVENTION

In order to achieve an effective closing, a fixed valve element commonly referred to as a fixed valve plate, and a movable valve plate of the mixing valve must be pressed against each other with a compressive force greater than the force exerted by the pressure of the flowing water because, otherwise, the water pressure would separate the movable valve plate from the fixed valve element preventing them to be closed, and similarly a compressive force must be applied between the fixed valve plate and its own support surface so as to compress a seal therebetween either to assure proper function of the seal or to prevent an ejection of the seal itself or its deformation in case excessive pressures should occur.

In most cases, the minimum compressive force necessary to compress the seal and to hold it tightly in its correct position is much higher than the minimum compressive force necessary to keep the fixed valve plate and the movable valve plate in operative contact. In known cartridge valve structures, the fixed valve plate is simply resting on a support seat in a bottom portion of a replaceable cartridge inside the faucet body and a compressive force is exerted between the movable valve plate and support seat which pushes the support seat toward the movable valve plate or vice versa.

As a consequence, the exerted compressive force must be at least equal to or greater than the higher one of the two minimum compressive forces needed for the specified purposes. In other words, the applied compressive force is equal to the compressive force necessary to compress the seal and hold it tightly in its correct position. The compressive force is thus unnecessarily high for the purpose of keeping the movable valve plate in contact with the fixed valve plate. Because of such excessively high force applied between the movable plate and fixed plate, the faucet is harder to operate and needless mechanical stresses of the parts are introduced. A cartridge valve in which its bottom portion is hydraulically biased to produce a compressive force between the fixed valve plate and movable valve plate are particularly disadvantaged by the above mentioned excessively high compressive forces.

SUMMARY OF THE INVENTION

In accordance with the invention, a mixing valve is constructed such that a compressive force greater than the compressive force between the fixed valve element and movable valve plate can be exerted onto the seal placed between the fixed valve element and its own support seat. The construction is achieved, according to the invention, with a certain attachment mechanism which connects the fixed valve element to its own support seat with the seal compressed between them and by keeping these parts under a compressive force.

Due to this construction, the compression of the seal beneath the fixed valve element is determined by the elastic and geometrical characteristics of the seal itself, the attachment mechanism and the connected parts. The compressive force is continuously applied on the attachment mechanism, the fixed valve element, its support seat, and the seals, independent of the forces applied from outside onto the fixed valve element and onto the support element.

Any external applied compressive forces can then have its magnitude determined exclusively to produce the necessary operating sealing contact between the fixed valve element and the movable valve plate. The compressive force between the fixed valve element and movable valve plate can be chosen by considering only the needs of contact between the fixed valve element and movable plate and without considering the fixing and compression of the seal under the fixed valve element.

The compressive force exerted between the plates can be either produced by an elastic element such as a spring or can be produced by exertion of water pressure on a bottom portion of the support seat which acts as a piston to push the fixed plate against the movable plate. The compressive force exerted between the plates can be greatly reduced thus obtaining a most easily operated mixing valve faucet free from the excessive frictional forces commonly existing between the plates.

BRIEF DESCRIPTION OF THE DRAWINGS

Reference is now made to the accompanying drawings in which:

FIG. 1 shows the side sectional view of a mixing valve including a cartridge according to the first embodiment of the invention;

FIGS. 2 through 4 similarly show side sectional views of the bottom cover assembly for a faucet cartridge including the fixed valve plate and its attachment mechanism in accordance with some alternate embodiments of the invention.

DETAILED DESCRIPTION OF THE PREFERRED EMBODIMENT

The faucet shown in FIG. 1 includes a body 1 that has two inlet pipes 7 and 8 connected thereto for the passage of hot and cold water. The body 1 has an internal chamber 2 that houses a cartridge and forms an annular periphery 2a communicating with an outlet port 2b. On the opposite side to the pipes 7 and 8, the chamber 2 is closed by a lid 5 threadedly connected to body 1. A seal 6 is interposed to prevent leakage.

The cartridge consists of a lower member 10 which is preferably made from plastic and is capable of axial motion in the chamber 2 of the faucet body 1. The lower member 10 has a bottom section 9 which has two depending male connections 11 and 12 provided with seals 11b and 12b which get sealed into female seats 3 and 4 provided in the faucet body Seats 3 and 4 have openings 3a and 4a therethrough. The bottom section 9 of the cover 10 has passages 11a and 12a through the respective connections 11 and 12 in communication with openings 3a and 4a and extend upward through a surface 9a that forms a support seat for a fixed valve plate 18 of the faucet.

The passages 11a and 12a are surrounded by the seals 16 and 17. In the present embodiment, the seals 16 and 17 comprise two separate annular pieces housed in corresponding annular grooves recessed in the bottom section 9 of the cover 10.

The seals 16 and 17, however, can be replaced by a single piece having a more complex form. The seals 16 and 17 function to seal between the support surface 9a and the fixed plate 18. The plate 18 has two openings 18a and 18b aligned with the passages 11a and 12a for the passage of hot and cold water.

A movable valve plate 19 abuts the fixed valve plate 18 and is attached to a control mechanism to move the valve plate 19. In particular, the movable valve plate 19 is affixed to a control slide 20 surrounded by a control ring 21 which is rotatably mounted in the cover 10. The slide 20 abuts on the opposite side from the plate 19 against a half bearing 22 fixed in the opening of the cover 10. The half bearing 22 abuts against the lid 5 which closes the faucet body 2. Another half bearing 23 is housed in the lid 5. An articulation ball 25 with a seal 24 is interposed between the half bearings 22 and 23.

An arm 26 extends outwardly from the ball 25. A cap 28 with an operating lever 29 is connected to the arm 26. A flat key 27 downwardly depends from ball 25 which is received in a corresponding seat of the control slide 20. The control mechanism, by various rotating and tilting of the lever 29, shifts the control slide 20 and the movable plate 19 mounted thereto, both in translation and rotation, relative to the fixed plate 18 so as to regulate, as desired, fluid flow from the pipes 7 and 8 which mix in the annular chamber periphery 2a where the mixed flow then exits outlet 2b.

In the space between the bottom section 9 of the cartridge cover 10 and the bottom of the faucet body 1, a spring 30 is positioned consisting of a disk bored for the passage of the connections 11 and 12 and arched so as to provide a repulsive force between the bottom of the body 1 and the bottom section 9 of the cartridge cover 10. Other spring constructions are possible such as elastomeric rings placed beneath the connections 11 and 12 or between the bottom 9 and body 1.

The fixed valve plate 18 is not simply resting on the support element consisting of the bottom 9 of the cartridge cover 10 as is known in the prior art, but it is secured to it by an attachment mechanism placed in such a way as to keep the seals 16 and 17 under compression.

Particularly, in the form represented in FIG. 1, the fixed plate 18 has a recessed central seat constructed to receive a screw head 31 whose threaded stem is screwed into the bottom 9 of the cartridge cover 10. The different parts are sized in such a way that, when the screw 31 is screwed down and keeps the fixed plate 18 positively in contact with the bottom 9. The seals 16 and 17 are compressed from a compressive force adequate to guarantee the sealing between the bottom 9 and the fixed plate 18 and to maintain the seals 16 and 17 in their seats against every action tending to eject them or deform them. This compressive force, which can also be high, is kept between the parts 9, 16, 17, 18, 31 without influencing the other faucet components.

Independently of the water pressure, the spring 30 applies a force onto the bottom of the cartridge cover 10 directed toward the lid 5. This force is transmitted from the bottom section 9 of the cover 10 to the fixed plate 18 and from the latter to the movable plate 19, to the slide 20, to the half bearing 22 and to the lid 5. This force keeps the cartridge bottom 10 in contact with the fixed plate 18 (through the seals 16 and 17 which result to be compressed by this force) and the plates 18 and 19 in contact with each other as well, providing them with a sealing contact. This force must be sufficient to guarantee a regular working of the faucet at low pressures.

The elastic spring 30, working between the faucet body and the cartridge, can be constructed so as to supply the minimum necessary compressive force for sealing contact between the plates 18 and 19. In many instances, spring 30 can be eliminated.

The water pressure, fed by the pipes 7 and 8, works on the connections 11 and 12 like they were pistons, by pushing them toward the plates 18 and 19 and through an opportune sizing of the different parts, it produces a force which transmits itself, like the one already considered, as far as the lid 5 and which increases the compressive force between the plates 18 and 19 for the effective working pressure by guaranteeing a correct behavior.

As the compressive force applied on the seals 16 and 17 does not affect any other faucet parts it therefore can be chosen higher than usual. Thus a higher freedom is afforded in planning these seals which can have a larger section or a more resilient force than those usually accepted for necessity. The screw 31 allows, if necessary, disassembly of the fixed plate off the cartridge but, in most cases, it is not required that such disassembly be carried out. Because the seals 16 and 17 are compressed independently of spring 30, the spring 30 no longer needs to supply the relatively high compressive force which is enough to compress the seals 16 and 17 and is widely excessive, in most cases, for the sealing contact between the plates 18 and 19 whose adhesion therefore occurs under an unnecessarily high pressure. This disadvantage of the previous valves is thereby eliminated.

Referring to FIG. 2, the fixed plate 18 with its central seat 15 can be held by a protuberance 13 integrally formed with the cartridge bottom 9 and can be hot pressed or pressed by using ultrasounds so as to form an enlarged head 13a while, during such operation, the plate 18 is being forced downwardly against the bottom 9 by a punch which supplies the necessary force to the compression of the seals 16 and 17 during assembly. The enlarged head 13a retains the plate 18 and provides the compressive force transmitted to seals 16 and 17.

Even other arrangements can be foreseen to cooperate with the central seat 15 of the fixed plate 18, for instance rivets, bent elements, strong elastic release teeth, and so on.

In FIG. 3 the fixed plate 18c can also be held against the bottom 9 of the cartridge cover by compressing the seals 16 and 17 and by notching the periphery of the plate and not in its center as it occurs in the previous valve forms. The plate 18c, according to FIG. 3, has a peripheral lowered seat 14 where some projections 32 of the cartridge cover 10 are engaged and provide the compressive force on seals 16 and 17. The projections 32 can consist of strong elastic release teeth or can be portions of the cover deformed by heat or by ultrasounds or in some other way, while the plate 18c, during such operation, is being pushed by a punch so as to compress the seals.

As shown in FIG. 4, the retention of the fixed plate 18c against the bottom 9 about its periphery can also be realized through an additional tool, like a ring 33 introduced into the lowered seat 14 of the disk and made integral to the cartridge cover 10. The ring can be made of plastics and can be fixed to the cover 10 through soldering or gluing or it can consist of an elastic ring which fixes itself through expansion (in this case it can be metallic). The fixed plate 18c could also be retained against the bottom 9 by a combination of either peripheral or central located attachments; i.e. by combining an embodiment like those shown in FIGS. 3 and 4 with an embodiment like those in FIGS. 1 and 2.

The seals 11b and 12b interposed between the support element and the body bottom, are desired to not cause higher axial thrust than the minimum compressive force required for the sealing contact between the plates. Radial seals 11b and 12b like the ones shown in FIG. 1, seals exerting only a moderate axial thrust or more complex seals whose axial thrust (or part of it), is somehow compensated without the thrust being transferred between the faucet plates.

Of course, different modifications, in addition to those already mentioned, can be used. For example, the fixing of the plate 18 could be made through two screws (like 31) placed along a diameter of the disk or through three screws placed like a triangle and so on.

Variations and modifications of the present invention are possible without departing from the scope and spirit as defined in the appended claims.

I claim:

1. A mixing valve comprising
   a faucet body having a cartridge receiving chamber;
   a cartridge housed in said cartridge receiving chamber and having a fluid receiving chamber and a support surface facing the fluid receiving chamber;
   a valve plate fixedly mounted on the support surface;
   a seal means interposed between the fixed plate and the support surface;
   a movable valve plate in contact against said fixed valve plate and operably connected to a control means for moving said valve plate relative to said fixed valve plate;
   compressive means for pressing the fixed valve plate against said support valve surface thereby compressing the seal means interposed between the fixed plate and said support surface independent of any smaller compressive forces exerted between said fixed plate and said movable plate.

2. A mixing valve as defined in claim 1 wherein
   said support surface comprises a movable bottom section of said cartridge;
   spring means is interposed between said bottom section and said faucet body and constructed to transmit a compressive force of a magnitude to sealingly press the two valve plates together to assure proper operation.

3. A mixing valve as defined in claim 1 wherein
   said compressive means includes an attachment device that cooperates with a substantially center portion of said fixed plate.

4. A mixing valve as defined in claim 3 wherein
   said attachment device is a screw that has a head recessed in a central seat of aid fixed valve plate and a threaded section that engages said support surface.

5. A mixing valve as defined in claim 3 wherein
   an integral protuberance extends from said support surface and engages a central seat recessed in said fixed valve plate;
   said protuberance has an enlarged head that retains said fixed valve plate to exert a compressive force against said seals interposed between said fixed valve plate and said support surface.

6. A mixing valve as defined in claim 1 wherein
   said compressive means includes an attachment device that cooperates with a substantially peripheral portion of said fixed plate.

7. A mixing valve as defined in claim 6 wherein
   said attachment device includes said fixed plate having a peripheral notch where projections from said support surface extend and engage said fixed plate.

8. A mixing valve as defined in claim 7 wherein
   said projections include strong elastic release teeth.

* * * * *